United States Patent
Polehn

(10) Patent No.: US 9,473,187 B2
(45) Date of Patent: Oct. 18, 2016

(54) WIRELESS RADIO EXTENSION USING UP- AND DOWN-CONVERSION

(71) Applicant: Cellco Partnership, Arlington, VA (US)

(72) Inventor: Donna L. Polehn, Kirkland, WA (US)

(73) Assignee: Cellco Partnership, Basking Ridge, NJ (US)

( * ) Notice: Subject to any disclaimer, the term of this patent is extended or adjusted under 35 U.S.C. 154(b) by 537 days.

(21) Appl. No.: 13/722,080

(22) Filed: Dec. 20, 2012

(65) Prior Publication Data

US 2014/0179302 A1   Jun. 26, 2014

(51) Int. Cl.
*H04B 1/38*   (2015.01)
*H04B 7/04*   (2006.01)
*H04B 7/02*   (2006.01)

(52) U.S. Cl.
CPC ............... *H04B 1/38* (2013.01); *H04B 7/026* (2013.01); *H04B 7/0413* (2013.01)

(58) Field of Classification Search
CPC ....... H04B 1/38; H04B 7/026; H04B 7/0413
See application file for complete search history.

(56) References Cited

U.S. PATENT DOCUMENTS

| | | | | |
|---|---|---|---|---|
| 6,961,369 B1* | 11/2005 | Tzannes | ........................ | 375/220 |
| 2004/0141529 A1* | 7/2004 | Lucidarme | ............ | H01Q 1/246 |
| | | | | 370/516 |
| 2006/0276227 A1* | 12/2006 | Dravida | ..................... | 455/562.1 |
| 2010/0144337 A1* | 6/2010 | Dean | ........................... | 455/422.1 |
| 2012/0329523 A1* | 12/2012 | Stewart et al. | ............ | 455/562.1 |

* cited by examiner

*Primary Examiner* — Fanghwa Wang

(57) ABSTRACT

A system may include a base station and a remote radio head ("RRH"). The base station may receive digital data streams destined for a user device, and generate a first set of modulated signals. The modulated signals may each be based on a different one of the digital data streams. The generated first set of modulated signals may be modulated within a first carrier frequency band. The base station may output the first set of modulated signals to the RRH. The RRH may generate a second set of modulated signals based on the first set of modulated signals. The second set of modulated signals being modulated within a second carrier frequency band, and may output the second set of modulated signals to the user device.

20 Claims, 10 Drawing Sheets

WIRELESS RADIO EXTENSION USING UP- AND DOWN-CONVERSION

BACKGROUND

User devices, such as cellular telephones, may connect to cellular networks via a radio access network ("RAN"). RANs may include base stations, which may serve as an interface between user devices and the cellular network. Base stations may include one or more antennas, via which the base stations may wirelessly communicate with user devices. Some base stations may be associated with remote antennas, such as remote radio heads ("RRHs"), which may be located in a different physical location from the base stations. User devices may communicate with base stations via these RRHs.

DETAILED DESCRIPTION OF PREFERRED EMBODIMENTS

The following detailed description refers to the accompanying drawings. The same reference numbers in different drawings may identify the same or similar elements.

A system and/or method, described herein, may allow a base station of a radio access network ("RAN") to make use of antennas (e.g., remote radio heads ("RRHs")), which are located in different physical locations than the base stations. The use of RRHs may provide an inexpensive way to extend the effective range of base stations. In some implementations, a base station may be connected to a RRH wirelessly, thus eliminating the need for wired connections that may ordinarily be required by an RRH standard (e.g., fiber optic cables), which may be costly and/or incapable of feasibly carrying data between the base station and the RRH. Furthermore, in some implementations, the base station may wirelessly communicate with the RRH over unlicensed microwave frequencies, thus avoiding the need to consume bandwidth associated with licensed frequencies (e.g., frequencies associated with a long term evolution ("LTE") cellular network). In some implementations, the base station may wirelessly communicate with the RRH over licensed microwave frequencies. In some implementations, as described further herein, base stations and RRHs that implement multi-in multi-out ("MIMO") technology, may communicate wirelessly, thus enhancing the flexibility of RRHs.

Figure 1:
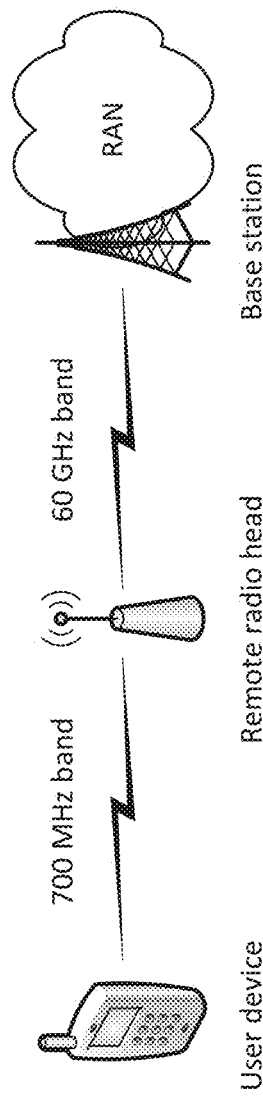
FIG. 1 illustrates an overview of one or more example implementations described herein.

FIG. 1 illustrates an overview of one or more example implementations described herein. As shown in FIG. 1, a user device (e.g., a cellular telephone) may be in communication with a base station associated with a RAN, via a RRH. That is, the user device may send and/or receive data to the RRH, which may relay the data to and/or from the base station. Assume that the user device is associated with licensed cellular frequencies, such as frequencies corresponding to a 700 MHz band (or another authorized mobile band). That is, the user device may ordinarily communicate with a cellular network over the 700 MHz band (e.g., may send and/or receive data to the base station and/or the RRH over the 700 MHz band). In some implementations, as described below, the RRH may communicate with the base station over different wireless frequencies (e.g., unlicensed frequencies, or frequencies outside of the mobile band), such as frequencies corresponding to a 60 GHz band. For instance, as described below, the base station may receive data intended for the user device. The base station may convert the data to an analog signal corresponding to the 60 GHz band, and may wirelessly transmit the analog signal to the RRH over the 60 GHz band. The RRH may receive the analog signal, may convert (e.g., "down-convert") the signal to the 700 MHz band associated with the user device, and may output the down-converted signal to the user device over the 700 MHz band.

Figure 2:
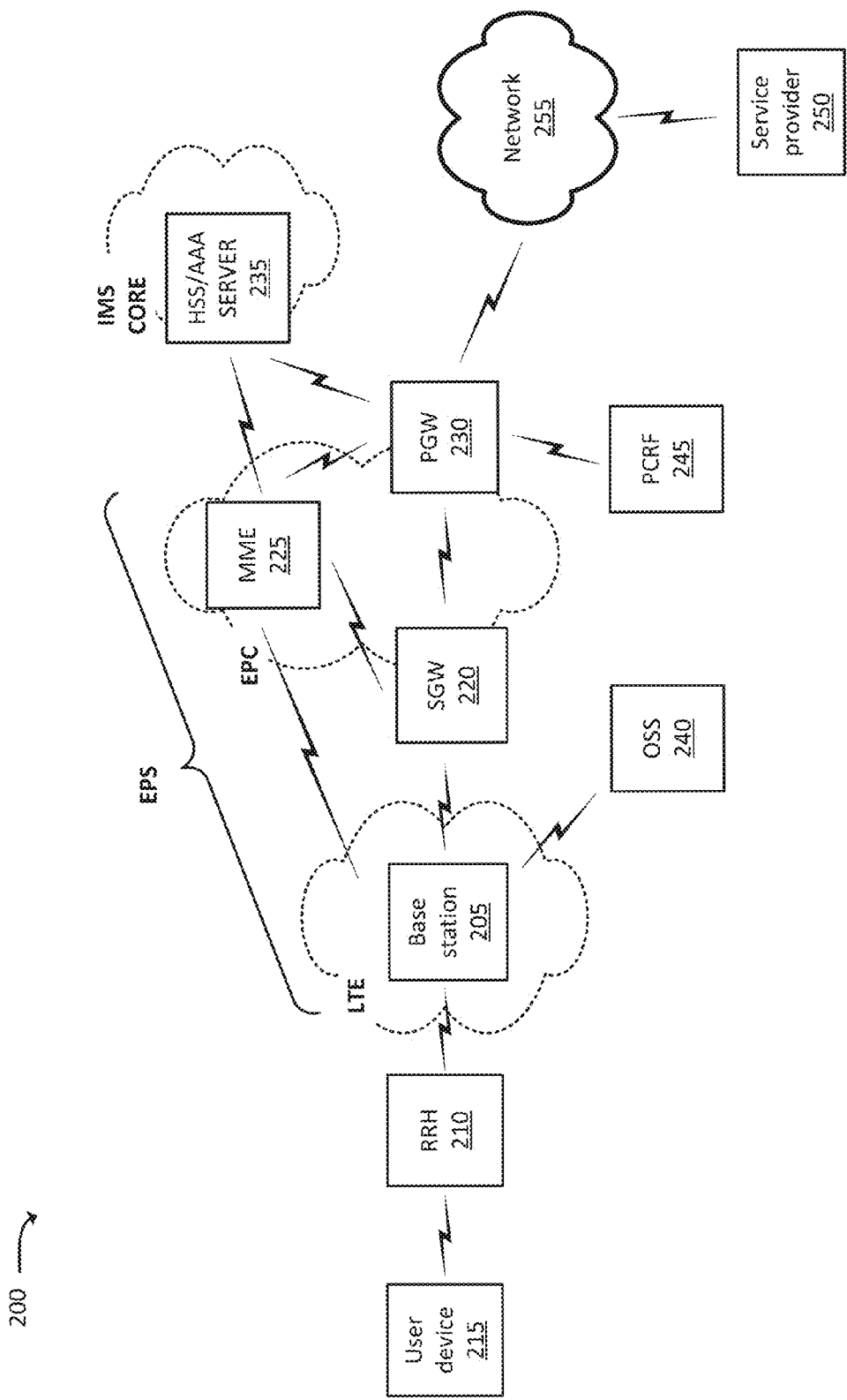
FIG. 2 illustrates an example environment in which systems and/or methods, described herein, may be implemented.

FIG. 2 illustrates an example environment 200, in which systems and/or methods described herein may be implemented. As shown in FIG. 2, environment 200 may include base station 205 (which may, in some implementations, take the form of an evolved node B ("eNB")), user device 215, serving gateway ("SGW") 220, mobility management entity device ("MME") 225, packet data network ("PDN") gateway ("PGW") 230, home subscriber server ("HSS")/authentication, authorization, accounting ("AAA") server 235 (hereinafter referred to as "HSS/AAA server 235"), operations support system ("OSS") 240, policy charging and rules function ("PCRF") 245, service provider 250, and network 255.

The quantity of devices and/or networks, illustrated in FIG. 2, is provided for explanatory purposes only. In practice, there may be additional devices and/or networks; fewer devices and/or networks; different devices and/or networks; or differently arranged devices and/or networks than illustrated in FIG. 2. Alternatively, or additionally, one or more of the devices of environment 200 may perform one or more functions described as being performed by another one or more of the devices of environment 200. Devices of environment 200 may interconnect via wired connections, wireless connections, or a combination of wired and wireless connections.

Environment 200 may include an evolved packet system ("EPS") that includes a LTE network and/or an evolved packet core ("EPC") network that operate based on a third generation partnership project ("3GPP") wireless communication standard. The LTE network may be, or may include, a RAN that includes one or more base stations 205, some or all of which, may take the form of an eNB, via which user device 215 may communicate with the EPC network. The EPC network may include one or more SGWs 220, MMEs 225, and/or PGWs 230, and may enable user device 215 to communicate with network 255 and/or an Internet protocol ("IP") multimedia subsystem ("IMS") core network. The IMS core network may include HSS/AAA server 235, and may manage authentication, session initiation, account information, a user profile, etc. associated with user device 215.

Base station 205 may include one or more network devices that receive, process, and/or transmit traffic, such as calls, audio, video, text, and/or other data, destined for and/or received from user device 215. In one example, base station 205 may be an eNB device and may be part of the LTE network. Additionally, or alternatively, one or more other base stations 205 may be associated with a RAN that is not associated with the LTE network (e.g., a wireless hot spot, a wireless access point, etc.). Base station 205 may receive traffic from and/or send traffic to network 255 via SGW 220 and PGW 230. Base station 205 may send traffic to and/or receive traffic from user device 215 via an air interface.

Base station 205 may also include one or more radio transceivers via which base station 205 may wirelessly communicate with RRH 210 (e.g., one or more radio transceivers that operate at an unlicensed frequency band, such as a high-frequency microwave band (e.g., a 60 GHz band)). Example components of base station 205, according to some implementations, are described in more detail below with respect to FIGS. 3, 5, 7A, and 7B. Via RRH 210, base station 205 may transmit data to and/or from user device 215.

RRH 210 may include one or more devices that communicate with user device 215 and with base station 205. In this sense, RRH 210 may serve as an interface between base station 205 and user device 215. For example, RRH 210 may forward data received from base station 205 to user device 215, and/or may forward data received from user device 215 to base station 205. RRH 210 may include one or more radio transceivers via which RRH 210 may wirelessly communicate with user device 215 (e.g., one or more radio transceivers that operate at a licensed frequency band, such as a frequency band associated with LTE networks). RRH 210 may also include one or more radio transceivers via which RRH 210 may wirelessly communicate with base station 205 (e.g., one or more radio transceivers that operate at an unlicensed frequency band, such as a high-frequency microwave band (e.g., a 60 GHz band), or a licensed frequency band that is outside of the frequency band used by user device 215). Example components of RRH 210, according to some implementations, are described in more detail below with respect to FIGS. 3, 5, and 7.

User device 215 may include any computation and communication device, such as a wireless mobile communication device that is capable of communicating with base station 205 and/or network 265 (e.g., via RRH 210, in some situations). For example, user device 215 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 215 may send traffic to and/or receive traffic from network 255 via signal bearers, such as base station 205, RRH 210, SGW 220, and/or PGW 230.

SGW 220 may include one or more network devices that gather, process, search, store, and/or provide information in a manner described herein. SGW 220 may, for example, aggregate traffic received from one or more base stations 205 and may send the aggregated traffic to network 265 via PGW 230.

MME 225 may include one or more computation and communication devices that gather, process, search, store, and/or provide information in a manner described herein. For example, MME 225 may perform operations to register user device 215 with the EPS, to establish bearer channels associated with a session with user device 215, to handoff user device 215 from the EPS to another network, to handoff user device 215 from the other network to the EPS, and/or to perform other operations. MME 225 may perform policing operations on traffic destined for and/or received from user device 215.

PGW 230 may include one or more network devices, or other types of computation and communication devices, that gather, process, search, store, and/or provide information in a manner described herein. PGW 230 may aggregate traffic received from one or more SGWs 220, etc. and may send the aggregated traffic to network 265. PGW 230 may also, or alternatively, receive traffic from network 265 and may send the traffic toward user device 215 via SGW 220 and/or base station 205.

HSS/AAA server 235 may include one or more server devices, or other types of devices, that gather, process, search, store, and/or provide information. For example, HSS/AAA server 235 may manage, update, and/or store, in a memory associated with HSS/AAA server 235, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 215 and/or one or more other user devices 215. Additionally, or alternatively, HSS/AAA server 235 may perform authentication, authorization, and/or accounting operations associated with the subscriber and/or a communication session with user device 215.

PCRF 245 may include one or more server devices, or other types of devices, that aggregate information to and from the EPC network, OSS 240, and/or other sources. PCRF 245 may receive information regarding policies and/or subscriptions from one or more sources, such as subscriber databases and/or from one or more users (such as, for example, an administrator associated with PCRF 245).

Network 255 may include one or more wired and/or wireless networks. For example, network 255 may include a packet data network (PDN), such as an IP-based PDN. Network 255 may include, for example, a wide area network such as the Internet, or one or more other networks. User device 215 may connect, through PGW 230, to data servers, application servers, or to other servers/applications that are coupled to network 255.

Figure 3:
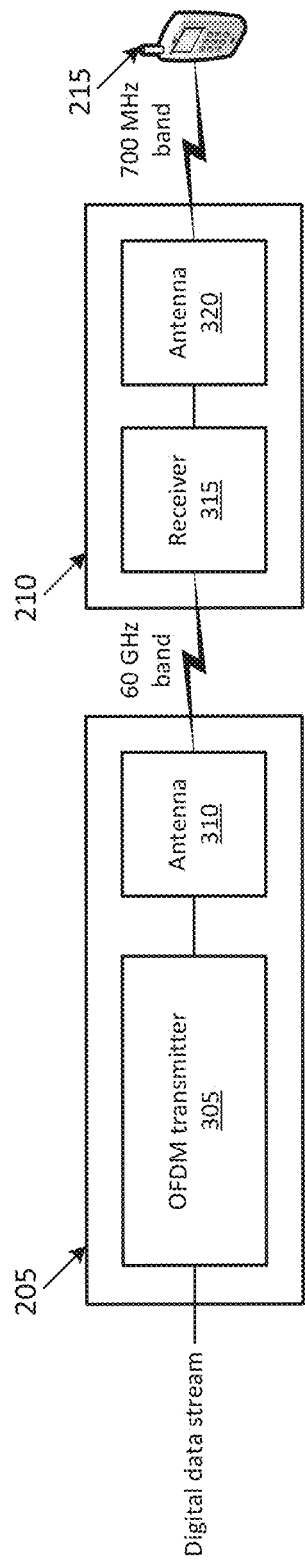
FIG. 3 illustrates example functional components of a base station and a RRH, according to one implementation described herein.

FIG. 3 illustrates example functional components of a base station and a RRH, according to one implementation. As shown in FIG. 3, base station 205 may include orthogonal frequency-division multiplexing ("OFDM") transmitter 305 and antenna 310, and RRH 210 may include receiver 315 and antenna 320. As mentioned above, base station 205 may receive data intended for user device 215 (e.g., may receive data from network 255 via one or more other components, such as PGW 230 and/or SGW 220). For instance, as shown in FIG. 3, base station 205 may receive data intended for user device 215 as a digital data stream. OFDM transmitter 305, of base station 205, may receive the digital data stream, and may generate a modulated signal (e.g., a modulated analog signal) based on the digital data stream. In order to generate the modulated signal, OFDM transmitter 305 may perform one or more other operations on the digital data stream, such as interleaving, serial-to-parallel conversion, inverse Fourier filter transformation ("IFFT") operations, and/or demultiplexing operations. OFDM transmitter 305 may, in some implementations, modulate the signal within a particular frequency band, such as an unlicensed frequency band (e.g., a 60 GHz band). The unlicensed frequency band may include a set of frequencies that are not licensed by an authority that grants licenses to wireless frequencies, such as an agency of a national government.

Antenna 310 may include circuitry and/or one or more devices that may transmit (e.g., wirelessly broadcast) the modulated signal at the frequency band. For example, antenna 310 may include one or more power amplifiers and/or radio transceivers.

Receiver 315, of RRH 210, may receive the transmitted modulated signal and re-radiate the signal on a different frequency band (e.g., a 700 MHz band). Receiver 315 may include circuitry and/or one or more devices that convert the modulated signal from the received frequency band to another frequency band. For example, receiver 315 may down-convert the received modulated signal (at, for example, a 60 GHz band) to a frequency band associated with licensed wireless telecommunications (e.g., a 700 MHz band).

Antenna 320 may transmit the modulated signal at the converted frequency band. For example, receiver 320 may include one or more power amplifiers and/or radio transceivers. Receiver 320 may output the converted modulated signal to, for example, user device 215. As may be apparent, this converted modulated signal may be an analog carrier signal that is based on the digital data stream.

While FIG. 3 is described above in the context of a data stream being sent to user device 215, similar techniques may be used for data streams being received from user device 215. For example, antenna 320, of RRH 210, may receive a data stream (e.g., as encoded on a modulated signal) from user device 215 at a 700 MHz band. Antenna 320 may provide the data stream, received from user device 215, to receiver 315, which may generate a modulated signal at a 60 GHz band (e.g., by up-converting the received signal). RRH 210 may output the modulated signal, at the 60 GHz band, to base station 205. Antenna 310, of base station 205, may receive the modulated signal, and may output the modulated signal to OFDM transmitter 305. OFDM transmitter 305 may generate a digital signal by performing one or more operations on the modulated signal, such as a multiplexing operation, a FFT operation, an analog-to-digital conversion operation, and/or another operation. Base station 205 may output the digital signal to network 255 via one or more other components, such as SGW 220 and/or PGW 230. As may be apparent, the digital signal, outputted by base station 205, may be based on the data stream received from user device 215 (e.g., may be a differently encoded version of the data stream received from user device 215).

Figure 4:
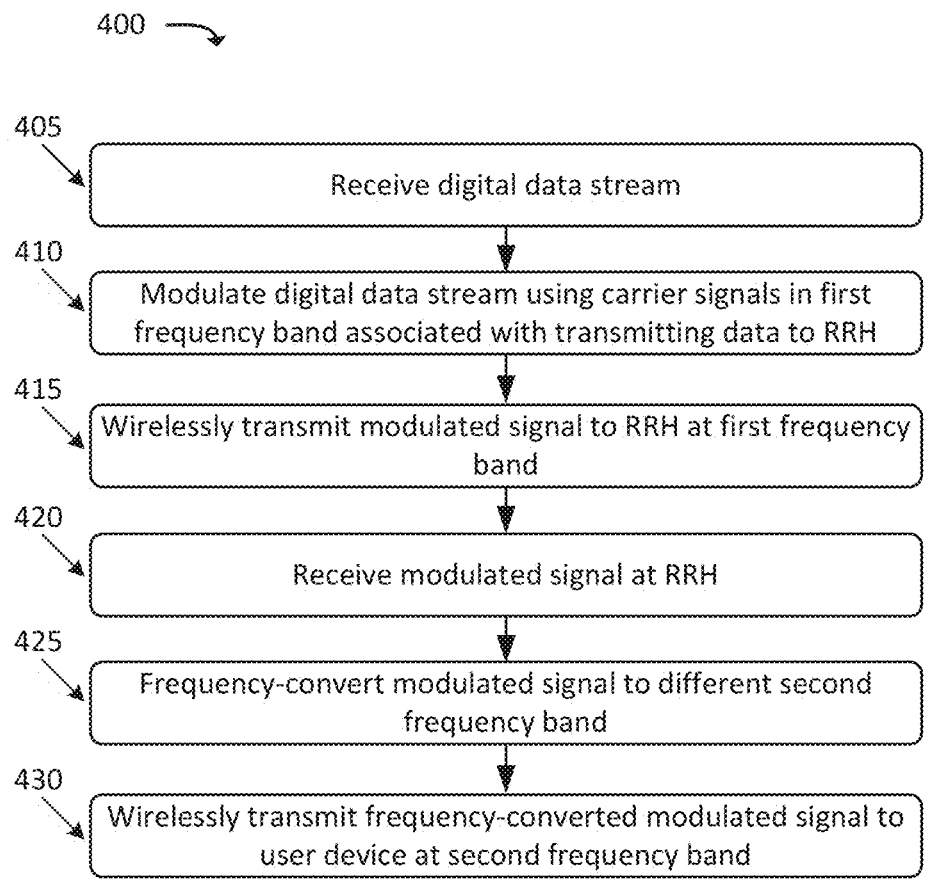
FIG. 4 illustrates an example process for sending data to a RRH from a base station, according to one implementation described herein.

FIG. 4 illustrates an example process 400 for sending data to a RRH from a base station. In one example implementation, process 400 may be performed by base station 205 and RRH 210 (e.g., by base station 205 and RRH 210 as described above with respect to FIG. 3).

Process 400 may include receiving a digital data stream (block 405). For example, base station 205 may receive a digital data stream from network 255 via one or more network components.

Process 400 may also include modulating the digital data stream using carrier signals in a first frequency band associated with transmitting data to a RRH (block 410). For example, OFDM transmitter 305, of base station 205, may modulate the digital data stream using carrier signals (e.g., analog carrier signals) in an unlicensed frequency band (e.g., a 60 GHz frequency band), in order to generate a modulated signal that is based on the digital data stream.

Process 400 may additionally include wirelessly transmitting the modulated signal to the RRH at the first frequency band (block 415). For example, antenna 310, of base station 205, may transmit the modulated signal (e.g., the modulated signal that is based on the digital data stream received at block 405), at the unlicensed microwave frequency band, to RRH 210.

Process 400 may further include receiving the modulated signal at the RRH (block 420). For example, receiver 315, of RRH 210, may receive the modulated signal.

Process 400 may also include frequency-converting the modulated signal to a second frequency band (block 425). For instance, receiver 315, of RRH 210, may convert the modulated signal to another frequency band, such as a licensed frequency band (e.g., a 700 MHz frequency band). That is, in some implementations, receiver 315 may down-convert the modulated signal, received at block 420, to a different frequency band.

Process 400 may additionally include wirelessly transmitting the frequency-converted modulated signal to a user device at the second frequency band (block 430). For example, receiver 320, of RRH 210, may output the frequency-converted modulated signal to user device 215.

Figure 5:
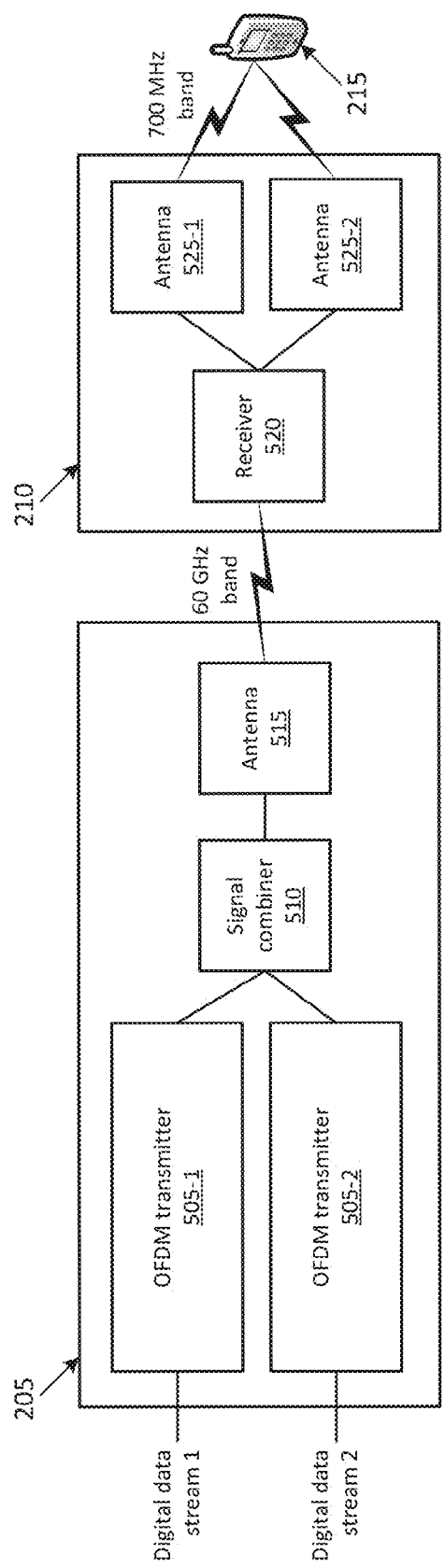
FIG. 5 illustrates example functional components of a base station and a RRH, according to one implementation described herein.

FIG. 5 illustrates example functional components of a base station and a RRH, according to one implementation. As shown in FIG. 5, base station 205 may include OFDM transmitter 505-1 and OFDM transmitter 505-2 (hereinafter referred to collectively as "OFDM transmitters 505," or individually as "OFDM transmitter 505"), signal combiner 510, and antenna 515. RRH 210 may include receiver 520, antenna 525-1, and antenna 525-2 (hereinafter referred to collectively as "antennas 525," or individually as "antenna 525"). Base station 205, RRH 210, and user device 215, as shown in FIG. 5, may correspond to a system that implements a technology by which multiple data streams may be simultaneously inputted and/or outputted by user device 215 via multiple radio transceivers (e.g., a MIMO technology).

As shown in FIG. 5, base station 205 may receive data intended for user device 215 as multiple digital data streams. These multiple digital data streams may correspond to, for example, multiple digital data streams associated with MIMO data intended for user device 215. OFDM transmitter 505-1, of base station 205, may receive one digital data stream, and OFDM transmitter 505-2 may receive another digital data stream. OFDM transmitters 505 may each generate a modulated signal (e.g., a modulated analog signal) based on the respective received digital data stream. The MIMO streams intended for eventual modulation on the 700 MHz frequency band may be transmitted as frequency-separated streams in the 60 GHz frequency band. In order to generate a modulated signal, OFDM transmitter 505 may perform one or more other operations on the respective received modulated signal, such as interleaving, serial-to-parallel conversion, IFFT operations, and/or demultiplexing operations. Each of OFDM transmitters 505 may, in some implementations, modulate each signal within a particular frequency band, such as an unlicensed frequency band (e.g., a 60 GHz band). For example, OFDM transmitter 505-1 may modulate a signal within 60.02-60.04 GHz, while OFDM transmitter 505-2 may modulate a signal within 60.04-60.06 GHz.

Signal combiner 510 may receive the modulated signals from OFDM transmitters 505, and may combine the modulated signals to generate a combined modulated signal that includes information from both of the modulated signals generated by OFDM transmitters 505. Continuing with the above example, the signal generated by signal combiner 510 may be modulated within 60.02-60.06 GHz.

Antenna 515 may include circuitry and/or one or more devices that may transmit the combined modulated signal at the encoded frequency band. For example, antenna 515 may include one or more power amplifiers and/or radio transceivers.

Receiver 520, of RRH 210, may receive the transmitted modulated signal. Receiver 520 may include circuitry and/or one or more devices that decode and separate the combined modulated into its component modulated signals. In some implementations, receiver 520 may be configured to separate the combined modulated signal into the component modulated signals (e.g., hardware and/or software of receiver 520 may be designed to separate the combined modulated signal according to the different frequency bands outputted by OFDM transmitters 505). Continuing with the above example, receiver 520 may separate the combined modulated signal into a first modulated signal that corresponds to the 60.02-60.04 GHz band (i.e., the output of OFDM transmitter 505-1, in this example), and a second modulated signal that corresponds to the 60.04-60.06 GHz band (i.e., the output of OFDM transmitter 505-2, in this example). Receiver 520 may frequency-convert the separated modulated signals to another frequency band. For example, receiver 520 may down-convert the modulated signals (at, for example, a 60.02-62.04 GHz band and a 60.04-60.06 GHz band) to a frequency band associated with licensed wireless telecommunications (e.g., one or more 700 MHz bands), and may output the down-converted signals using an MIMO technique in, for example, a 700-720 MHz band. Alternatively, in some implementations, receiver 520 may frequency-convert the combined modulated signal (received from antenna 515) before separating the combined modulated signal.

Antenna 525-1 and antenna 525-2 (hereinafter referred to collectively as "antennas 525," or individually as "antenna 525") may include circuitry and/or one or more devices that may transmit the modulated signals at the converted frequency band. For example, antennas 525 may include one or more power amplifiers and/or radio transceivers. Antennas 525 may output the modulated signals to, for example, user device 215. As mentioned above, user device 215 may include multiple radio transceivers, which may receive the modulated signals, and may each process a different one of the modulated signals.

While FIG. 5 is described above in the context of two OFDM transmitters 505 and two antennas 525, in some implementations, base station 205 may include a different number of OFDM transmitters 505, and RRH 210 may include a different number of antennas 525. For example, in some implementations, base station 205 may include four OFDM transmitters 505, and RRH 210 may include four or more antennas 525, which may be associated with four or more MIMO streams.

Furthermore, while FIG. 5 is described above in the context of data streams being sent to user device 215, similar techniques may be used for data streams being received from user device 215. For example, antennas 525, of RRH 210, may receive data streams from user device 215 at a 700 MHz band. These data streams may correspond to, for example, a MIMO communication from user device 215. Antennas 525 may output the data streams to receiver 520, which may generate a modulated signal at a 60 GHz band (e.g., by up-converting the received data streams and, in some implementations, by combining signals based on the data streams). RRH 210 may output the modulated signal at the 60 GHz band to base station 205.

Antenna 515, of base station 205, may receive the modulated signal. In some implementations, antenna 515 may include, or be associated with, circuitry and/or logic to separate the component modulated signals from the modulated signal received from RRH 210. In some such implementations, antenna 515 may include, or be associated with, circuitry and/or logic that is similar to some of the circuitry and/or logic of receiver 520. Antenna 515 may output the modulated signal to OFDM transmitters 505 (e.g., via signal combiner 510 in some implementations, or bypassing signal combiner 510 in other implementations). OFDM transmitters 505 may each generate a digital signal (e.g., a digital signal that is based on a particular data stream received from user device 215) by performing one or more operations on the respective received modulated signal, such as a multiplexing operation, a FFT operation, an analog-to-digital conversion operation, and/or another operation. Base station 205 may output the digital signals to network 255 via one or more other components, such as SGW 220 and/or PGW 230.

Figure 6:
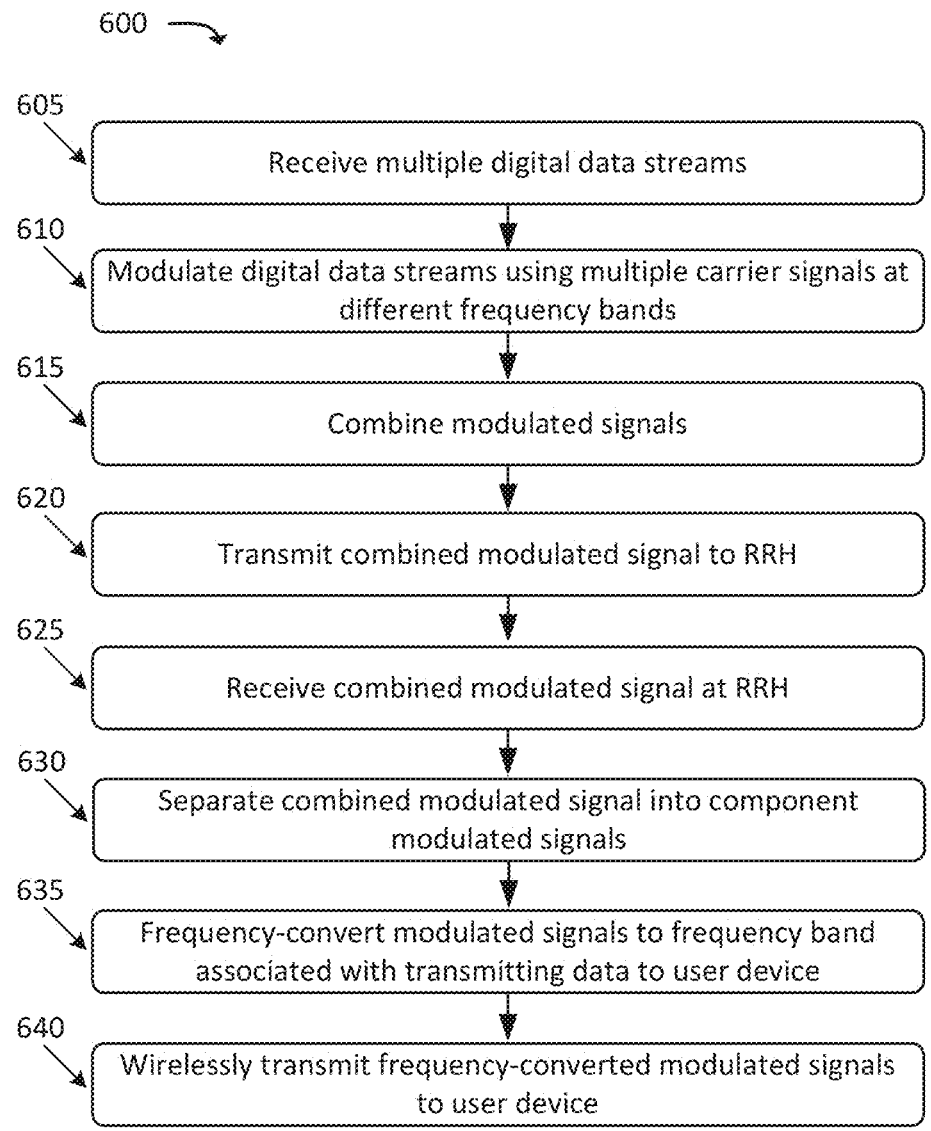
FIG. 6 illustrates another example process for sending data to a RRH from a base station, according to one implementation described herein.

FIG. 6 illustrates an example process 600 for sending data to a RRH from a base station. In one example implementation, process 600 may be performed by base station 205 and RRH 210 (e.g., by base station 205 and RRH 210 as described above with respect to FIG. 5).

Process 600 may include receiving multiple digital data streams (block 605). For example, base station 205 may receive multiple digital data streams from network 255 via one or more network components. As mentioned above, the multiple digital data streams may be digital data streams associated with, for example, MIMO communications.

Process 600 may also include modulating the digital data streams using multiple carrier signals at different frequency bands (block 610). For example, OFDM transmitters 505, of base station 205, may modulate the digital data streams (received at block 605) using carrier signals (e.g., analog carrier signals) in multiple unlicensed frequency bands (e.g., multiple 60 GHz frequency bands in a 60 GHz frequency band spectrum), in order to generate modulated signals that are based on the digital data streams.

Process 600 may further include combining the modulated signals (block 615). For example, signal combiner 510, of base station 205, may generate a combined modulated signal based on the modulated signals (generated at block 610). The combined modulated signal may, in some implementations, include all of the data included in the digital data streams received at block 605. The signals may be combined (at block 615) in a frequency-separated fashion.

Process 600 may additionally include wirelessly transmitting the combined modulated signal to the RRH (block 620). For example, antenna 515, of base station 205, may transmit the combined modulated signal, at one or more unlicensed frequency bands associated with the modulated signals generated at block 610, to RRH 210.

Process 600 may further include receiving the combined modulated signal at the RRH (block 625). For example, receiver 520, of RRH 210, may receive the combined modulated signal.

Process 600 may also include separating the combined modulated signal into its component modulated signals (block 630). For example, receiver 520 may separate the combined modulated signal. These separated modulated signals may correspond to, for example, the modulated signals generated at block 610.

Process 600 may additionally include frequency-converting the component modulated signals to a frequency band associated with transmitting data to a user device (block 635). For instance, receiver 520, of RRH 210, may convert the component modulated signals to another frequency band, such as a licensed frequency band (e.g., a 700 MHz frequency band). That is, in some implementations, receiver 520 may generate one or more modulated signals based on the component modulated signals. In some implementations, receiver 520 may frequency-convert the component modulated signals to the same frequency band. In some implementations, receiver 520 may frequency-convert the component modulated signals to different frequency bands within the same frequency band spectrum. For example, the modulated signal at the 60.00-60.02 GHz band and the modulated signal at the 60.02-60.04 GHz band may be combined using an MIMO technique and re-radiated at a 700-720 MHz band.

Process 600 may further include wirelessly transmitting the frequency-converted component modulated signals to a user device (block 640). For example, antennas 525, of RRH 210, may output the frequency-converted component modulated signals to user device 215. As mentioned above, user device 215 may include multiple radio transceivers, each of which may separately process a different one of the frequency-converted component modulated signals.

Figure 7A:
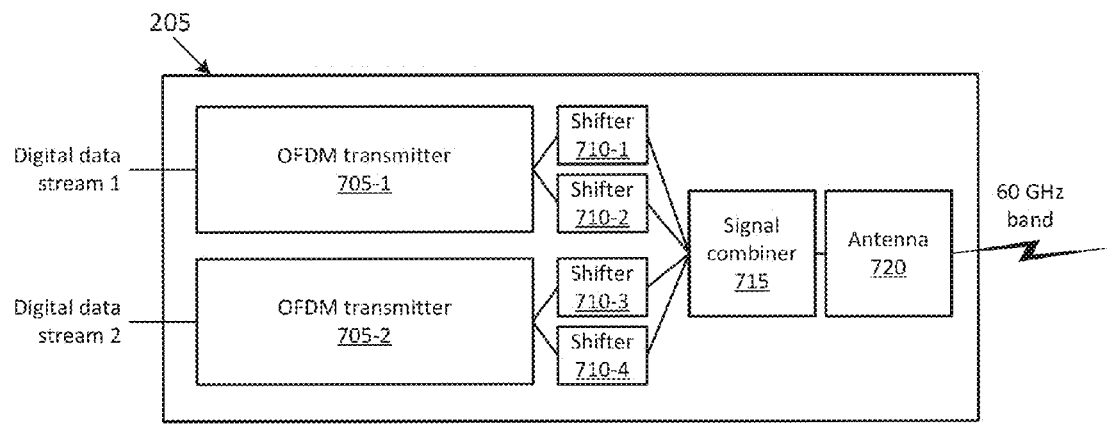
FIGS. 7A and 7B illustrate example functional components of a base station and a RRH, according to one implementation described herein.

FIG. 7A illustrates example functional components of a base station, according to one implementation. As shown in FIG. 7A, base station 205 may include OFDM transmitter 705-1 and OFDM transmitter 705-2 (hereinafter referred to collectively as "OFDM transmitters 705," or individually as "OFDM transmitter 705"), shifter 710-1 through shifter 710-4 (hereinafter referred to collectively as "OFDM transmitters 705," or individually as "OFDM transmitter 705"), signal combiner 715, and antenna 720. Base station 205, as shown in FIG. 5, may correspond to a system that implements a technology by which multiple data streams may be simultaneously inputted and/or outputted by a user device via multiple radio transceivers (e.g., using frequency separation in the 60 GHz band).

As shown in FIG. 7A, base station 205 may receive data intended for user device 215 as multiple digital data streams. These multiple digital data streams may correspond to, for example, multiple digital data streams associated with MIMO data intended for user device 215. OFDM transmitter 705-1, of base station 205, may receive one digital data stream, and OFDM transmitter 705-2 may receive another digital data stream. OFDM transmitters 705 may each generate a set of modulated signals based on the respective received digital data stream. In order to generate a set of modulated signals, OFDM transmitter 705 may perform one or more other operations on the respective received digital stream, such as interleaving, serial-to-parallel conversion, IFFT operations, and/or demultiplexing operations. Each of OFDM transmitters 705 may, in some implementations, generate a set of modulated signals within a particular frequency band, such as an unlicensed frequency band (e.g., a 60 GHz band). For example, OFDM transmitter 705-1 may modulate a set of signals within 60.02-60.04 GHz, while OFDM transmitter 705-2 may modulate a set of signals within 60.04-60.06 GHz.

Each OFDM transmitter 705 may output the respective modulated signals to one or more shifters 710. For example, OFDM transmitter 705-1 may output a modulated signal to each of shifter 710-1 and shifter 710-2. Each individual shifter 710 may arbitrarily and/or randomly phase-shift the modulated signal received from a respective OFDM transmitter 705. For instance, assume that shifter 710-1 and shifter 710-2 each receive a modulated signal (that is, shifter 710-1 and shifter 710-2 each receive a copy of the same modulated signal) from OFDM transmitter 705-1 at a 60 GHz frequency band. In some implementations, shifter 710-1 may phase-shift the received modulated signal by a first amount (e.g., +0.01π), while shifter 710-2 may phase-shift the received modulated signal by a different second amount (e.g., +0.02π). Each shifter output may be placed on the 60 Ghz band in a frequency-separated fashion. That is, the output of shifter 710-1 may be placed on 60.00-60.02 Ghz, the output of shifter 710-2 may be placed on 60.02-60.04 Ghz, the output of 710-3 may be placed on 60.04-60.06 Ghz, and the output of 710-4 may be placed on 60.06-60.08 Ghz, for example.

In some implementations, base station 205 may include fewer shifters 710, for each OFDM transmitter 705, than the number of modulated signals outputted by OFDM transmitter 705. For example, assuming OFDM transmitter 705 outputs two modulated signals, base station 205 may, in some implementations, include only one shifter 710 that receives a modulated signal from OFDM transmitter 705. Thus, in some such implementations, one or more of the modulated signals outputted by OFDM transmitter 705 may not be phase-shifted, while one or more other modulated signals outputted by OFDM transmitter 705 may be phase-shifted. More shifted copies of each signal stream, that is frequency-separated at the 60 GHz band, may provide more redundancy, and thus increase the reliability and reach of the 60 GHz path.

Signal combiner 715 may receive the shifted modulated signals from shifters 710, and may combine the modulated signals to generate combined modulated signal that includes information from the modulated signals generated by shifters 710. Continuing with the above example, the modulated signal generated by signal combiner 715 may be a signal modulated within 60.02-60.08 GHz.

Antenna 720 may include circuitry and/or one or more devices that may transmit the combined modulated signal at the encoded frequency bands. For example, antenna 720 may include one or more power amplifiers and/or radio transceivers.

Figure 7B:
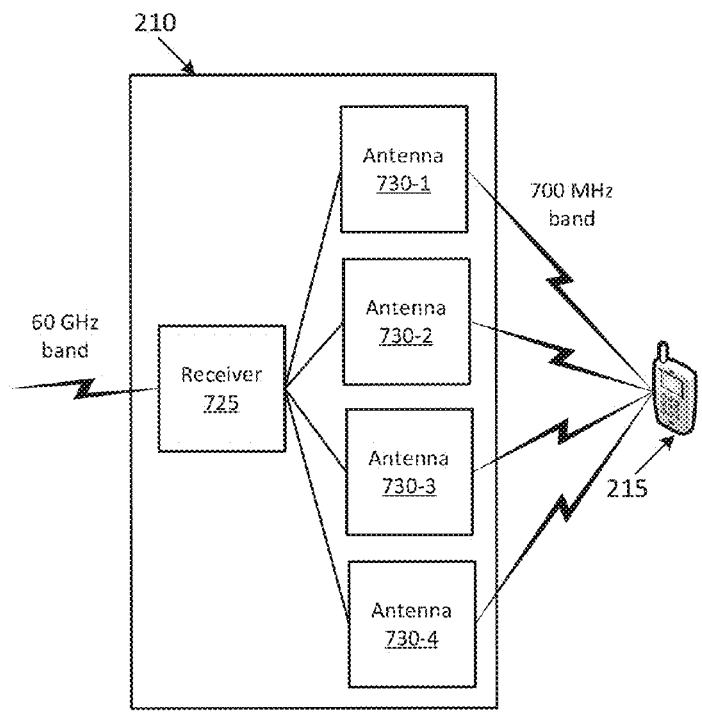

FIG. 7B illustrates example functional components of a RRH, according to one implementation. RRH 210 may include receiver 725 and antenna 730-1 through antenna 730-4 (hereinafter referred to collectively as "antennas 730," or individually as "antenna 730"). RRH 210 and user device 215, as shown in FIG. 7, may correspond to a system that implements a technology by which multiple data streams may be simultaneously inputted and/or outputted by user device 215 via multiple radio transceivers (e.g., a MIMO technology).

Receiver 725, of RRH 210, may receive the transmitted modulated signal (e.g., as transmitted by antenna 720 of base station 205). Receiver 725 may include circuitry and/or one or more devices that decode and separate (e.g., by frequency) the combined modulated signal into its component modulated signals. In some implementations, receiver 725 may be configured to separate the combined modulated signal into the component modulated signals (e.g., hardware and/or software of receiver 725 may be designed to separate the combined modulated signal according to the different frequency bands outputted by OFDM transmitters 705, as further modified by shifters 710). Receiver 725 may receive the 60 GHz frequency-separated signal and re-radiate the signal in the 700 MHz band as a MIMO signal.

Continuing with the above example, receiver 725 may separate the combined modulated signal into four component modulated signals. For example, two of the component modulated signals may correspond to the 60.02-60.04 GHz band (i.e., the output of OFDM transmitter 705-1, in this example), and the other two component modulated signals may correspond to the 60.04-60.06 GHz band (i.e., the output of OFDM transmitter 705-2, in this example). Furthermore, in this example, one component modulated signal, of the component modulated signals that correspond to the 60.02-60.04 GHz band, may correspond to a particular phase shift, while another component modulated signal, of the component modulated signals that correspond to the 60.02-60.04 GHz band, may correspond to another particular phase shift. Thus, in the example shown in FIG. 7B, receiver 725 may output two copies of each of the modulated signals (e.g., two copies of each of the modulated signals outputted by OFDM transmitters 705), each corresponding to a different phase shift. That is, one copy of a particular modulated signal may correspond to one particular phase shift, while another copy of the same modulated signal may correspond to a different phase shift. This may provide the appearance of multiple modulated signals being pseudo-randomly spaced. If the path between RRH 210 and base station 205 is partially impaired or noisy, one copy of the modulated signal may be useable to RRH 210 to do frequency diversity, thus providing a redundant signal and boosting the path reach for the link between RRH 210 and base station 205.

Receiver 725 may frequency-convert the component modulated signals to another frequency band. For example, receiver 725 may down-convert the received modulated signals (at, for example, a 60.02-60.04 GHz band and a 60.04-60.06 GHz band) to a frequency band associated with licensed wireless telecommunications (e.g., a 700-720 MHz band) as a single MIMO signal. Alternatively, in some implementations, receiver 725 may frequency-convert the combined modulated signal (received from antenna 720) before separating the combined modulated signal.

Antenna 730-1 through antenna 730-4 (hereinafter referred to collectively as "antennas 730," or individually as "antenna 730") may include circuitry and/or one or more devices that may transmit the modulated signals at the converted frequency band. For example, antennas 730 may include one or more power amplifiers and/or radio transceivers. Antennas 730 may output the modulated signals to, for example, user device 215. As mentioned above, user device 215 may include multiple radio transceivers, each of which may process a different one of the modulated signals outputted by antennas 730. Transmitting multiple phase-shifted copies of the same modulated signal, according to some implementations, may increase the possibility that user device 215 receives the modulated signal, since certain factors (such as geographical terrain, buildings, interference, or other factors) may prevent one copy of the modulated signal from reaching user device 215, but may not prevent another copy of the modulated signal from reaching user device 215.

While FIGS. 7A and 7B are described above in the context of two OFDM transmitters 705, four shifters 710, and four antennas 730, in some implementations, base station 205 may include a different number of OFDM transmitters 705 and shifters 710, and RRH 210 may include a different number of antennas 730. For example, in some implementations, base station 205 may include four OFDM transmitters 705 and sixteen shifters 710, and RRH 210 may include sixteen antennas 730.

Furthermore, while FIGS. 7A and 7B are described above in the context of data streams being sent to user device 215, similar techniques may be used for data streams being received from user device 215. For example, antennas 730, of RRH 210, may receive data streams from user device 215 at a 700 MHz band. These data streams may correspond to, for example, a MIMO communication from user device 215. In some implementations, user device 215 may include one or more shifters, similar to shifters 710, which may phase-shift copies of data signals being outputted by user device 215. In some such implementations, user device 215 may include one radio transceiver for each data stream outputted. In the example shown in FIG. 7A, user device 215 may output four modulated signals (e.g., two phase-differentiated copies of each of two different modulated signals) to RRH 210.

Antennas 730 may output the modulated signals to receiver 725. In some situations, a particular antenna 730 may not receive a modulated signal stream from user device 215. For example, in some implementations, user device 215 may not output multiple phase-differentiated copies of the same data stream. In some situations, one or more modulated signals may be lost (e.g., due to interference, terrain, buildings, or other factors). In some implementations, receiver 725 may generate a phase-shifted copy of a received modulated signal. For example, assume that receiver 725 receives a modulated signal from antenna 730-1, and does not receive a corresponding modulated signal from antenna 730-2 (e.g., a phase-shifted copy of the modulated signal). In some implementations, receiver 725 may generate a phase-shifted copy of the modulated signal received from antenna 730-1.

Receiver 725 may generate a modulated signal at a 60 GHz band (e.g., by up-converting the modulated signals received from antennas 730 and, in some implementations, by combining the modulated signals). RRH 210 may output the combined modulated signal at the 60 GHz band to base station 205.

Antenna 720, of base station 205, may receive the combined modulated signal. In some implementations, antenna 720 may include, or be associated with, circuitry and/or logic to separate the combined modulated signal, received from RRH 210, into component modulated signals. In some such implementations, antenna 720 may include, or be associated with, circuitry and/or logic that is similar to some of the circuitry and/or logic of receiver 725. Antenna 720 may output the component modulated signals to OFDM transmitters 705 (e.g., via signal combiner 715 in some implementations and/or respective shifters 710, or bypassing signal combiner 715 and shifters 710 in other implementations). OFDM transmitters 705 may each generate a digital signal by performing one or more operations on the respective received modulated signals, such as a multiplexing operation, a de-multiplexing operation, a FFT operation, an analog-to-digital conversion operation, and/or another operation. Base station 205 may output the digital signals to network 255 via one or more other components, such as SGW 220 and/or PGW 230.

Figure 8:
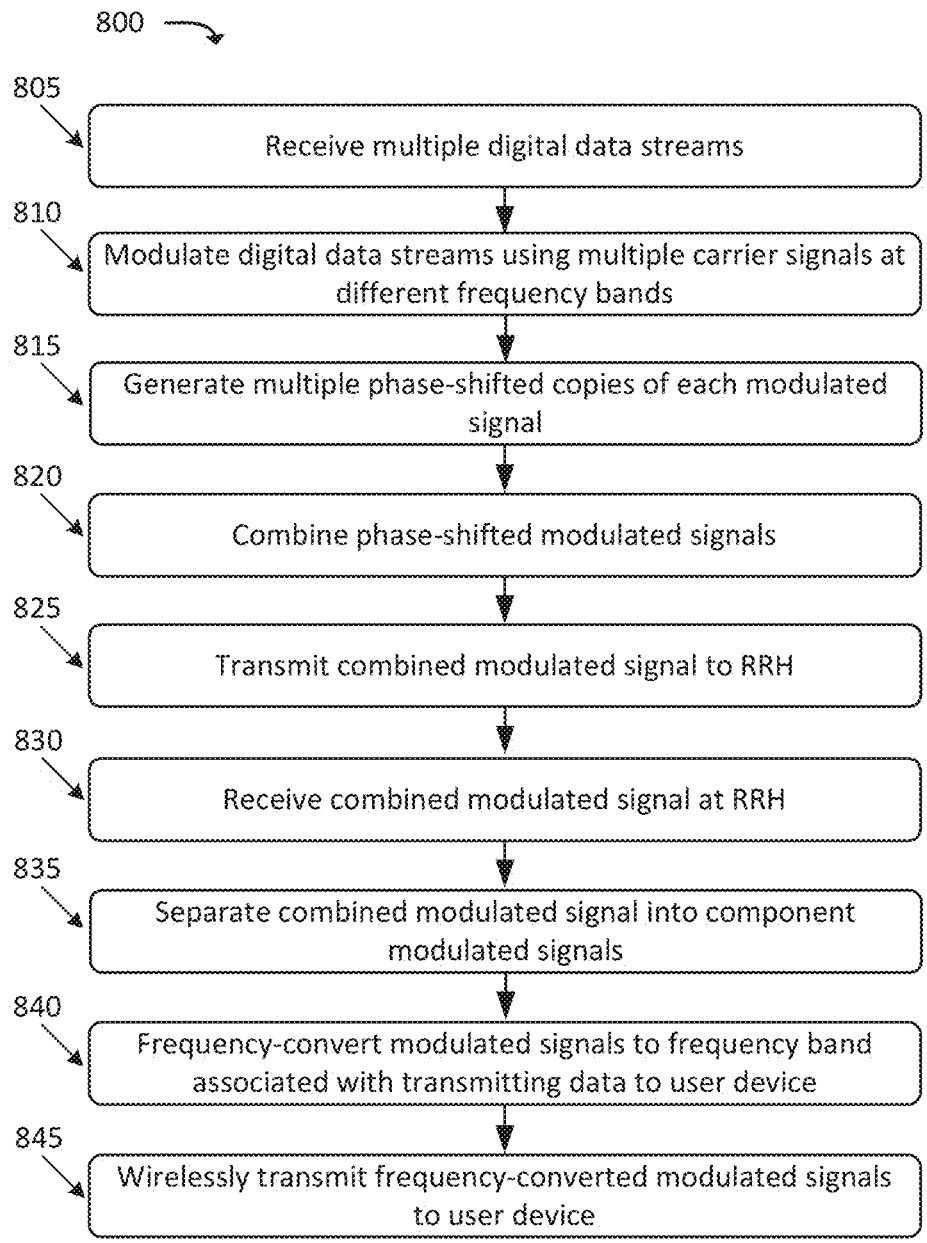
FIG. 8 illustrates yet another example process for sending data to a RRH from a base station, according to one implementation described herein.

FIG. 8 illustrates an example process 800 for sending data to a RRH from a base station. In one example implementation, process 800 may be performed by base station 205 and RRH 210 (e.g., by base station 205 and RRH 210 as described above with respect to FIGS. 7A and 7B).

Process 800 may include receiving multiple digital data streams (block 805). For example, base station 205 may receive multiple digital data streams from network 255 via one or more network components. As mentioned above, the multiple digital data streams may be digital data streams associated with, for example, MIMO communications.

Process 800 may also include modulating the digital data streams using multiple carrier signals at different frequency bands (block 810). For example, OFDM transmitters 705, of base station 205, may modulate the digital data streams (received at block 705) using carrier signals (e.g., analog carrier signals) in multiple unlicensed frequency bands (e.g., multiple 60 GHz frequency bands in a 60 GHz frequency band spectrum), in order to generate modulated signals that are based on the digital data streams.

Process 800 may further include generating multiple phase-shifted copies of each modulated signal (block 815). For example, a particular OFDM transmitter 705 may output multiple copies of a modulated signal to a set of OFDM transmitters 710. As mentioned above, in some implementations, one or more copies of the modulated signal outputted by a particular OFDM transmitter 705 may not be phase-shifted. In some such implementations, the modulated signal that is not phase-shifted may have a phase difference with another copy of the modulated signal that is phase-shifted.

Process 800 may further include combining the phase-shifted modulated signals (block 820). For example, signal combiner 715, of base station 205, may generate a combined modulated signal based on the phase-shifted modulated signals (generated at block 815). In some implementations, where one or more modulated signals, outputted by a particular OFDM transmitter 705, are not phase-shifted, signal combiner 715 may also combine such un-shifted modulated signals at block 820. The combined modulated signal may, in some implementations, include all of the data included in the modulated signals generated at block 815 (e.g., all of the data included in phase-shifted modulated signals, in addition to any data included in modulated signals that have not been phase-shifted).

Process 800 may additionally include wirelessly transmitting the combined modulated signal to the RRH (block 825). For example, antenna 720, of base station 205, may transmit the modulated signal, at one or more unlicensed frequency bands associated with the modulated signals generated at block 820, to RRH 210.

Process 800 may further include receiving the combined modulated signal at the RRH (block 830). For example, receiver 725, of RRH 210, may receive the combined modulated signal.

Process 800 may also include separating the combined modulated signal into its component modulated signals (block 835). For example, receiver 725 may separate the combined modulated signal. These component modulated signals may correspond to, for example, the phase-shifted modulated signals generated at block 820. In some implementations, where one or more of the modulated signals outputted by OFDM transmitter 705 are not phase-shifted, one or more of the component modulated signals, may correspond to modulated signals that are not phase-shifted.

Process 800 may additionally include frequency-converting the component modulated signals to a frequency band associated with transmitting data to a user device (block 840). For instance, receiver 725, of RRH 210, may convert the component modulated signals to another frequency band, such as a licensed frequency band (e.g., a 700 MHz frequency band). That is, in some implementations, receiver 725 may generate one or more modulated signals based on the component modulated signals. In some implementations, receiver 725 may frequency-convert the component modulated signals to the same frequency band. In some implementations, receiver 725 may frequency-convert the component modulated signals to different frequency bands within the same frequency band spectrum (e.g., may frequency-convert one component modulated signal to a 720-740 MHz band, and may frequency-convert another component modulated signal to a 740-760 MHz band).

Process 800 may further include wirelessly transmitting the frequency-converted modulated signals to a user device (block 845). For example, antennas 730, of RRH 210, may output the frequency-converted modulated signals to user device 215. As mentioned above, wirelessly transmitting the frequency-converted modulated signals may include transmitting multiple different copies of the same data. For instance, two copies of the same data may be transmitted (at block 845) as two different modulated signals, with two different phases. As mentioned above, user device 215 may include multiple radio transceivers, each of which may process a different one of the frequency-converted modulated signals.

Figure 9:
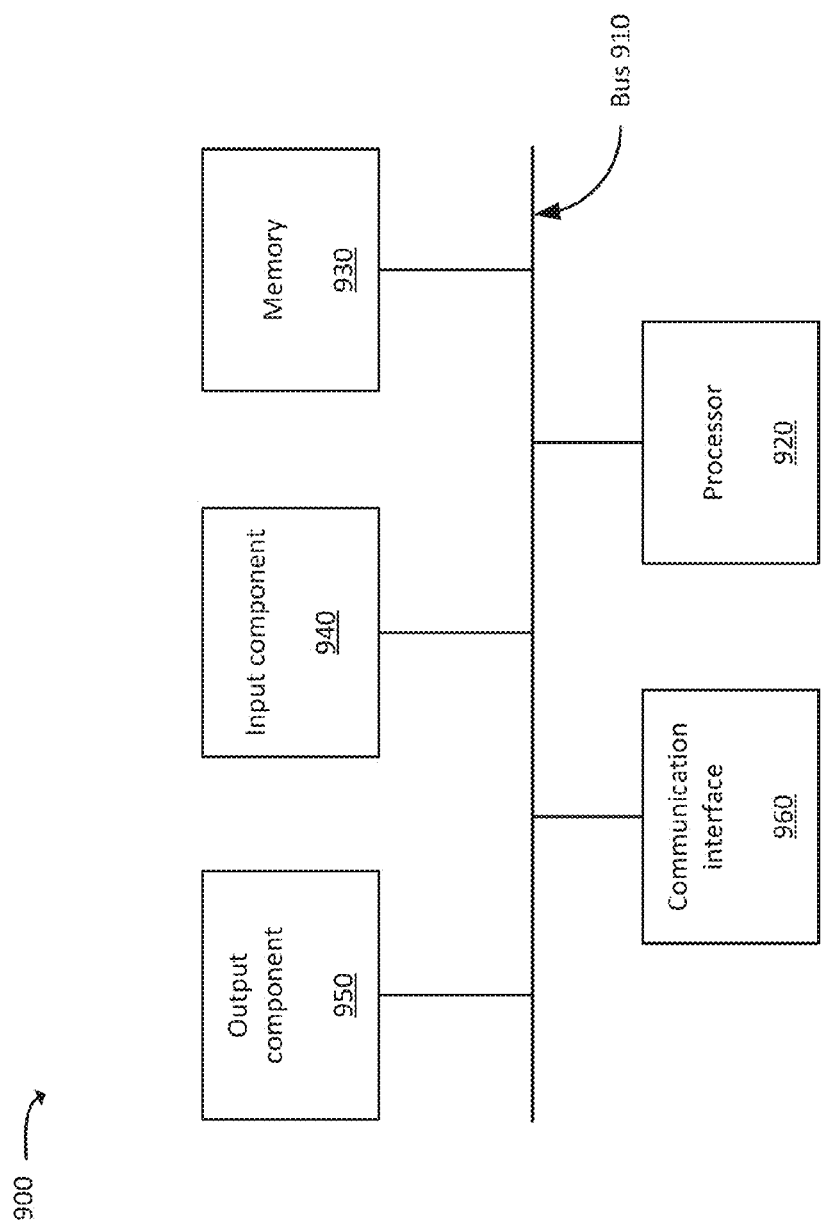
FIGS. 9 and 10 illustrate example components of one or more devices shown in FIGS. 1-3, 5, 7A, and 7B.

FIG. 9 is a diagram of example components of device 900. One or more of the devices illustrated in FIGS. 1-3, 5, 7A, or 7B may include one or more devices 900. For example, user device 215, SGW 220, HSS/AAA server 235, and/or another one of the devices shown in these figures may include one or more devices 900. Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

Figure 10:
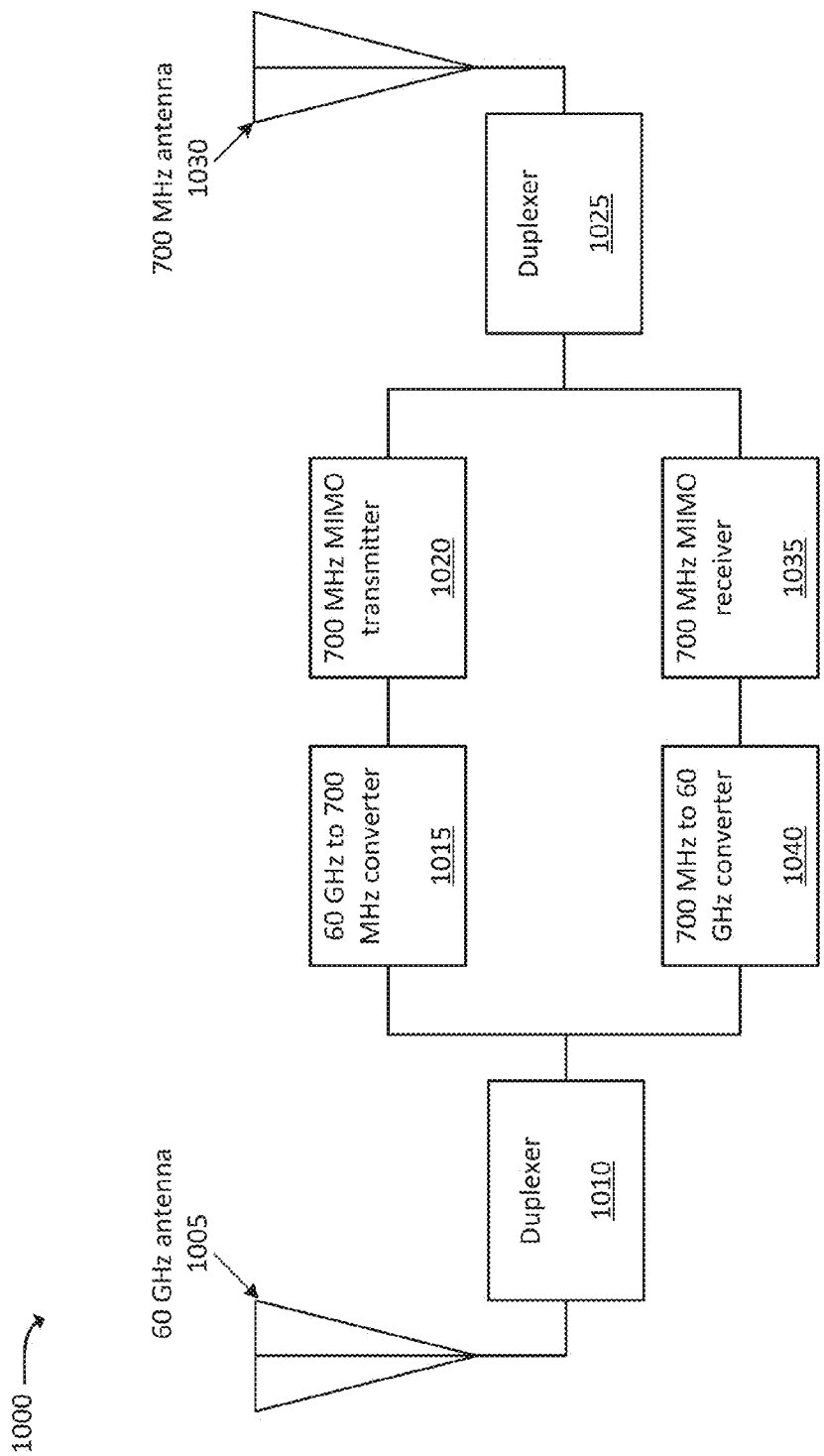

FIG. 10 is a diagram of example components of device 1000. Device 1000 may correspond to an RRH of some implementations, such as RRH 210, shown in FIGS. 1-3, 5, and 7B. Device 1000 may include antenna 1005, duplexer 1010, converter 1015, transmitter 1020, duplexer 1025, antenna 1030, receiver 1035, and converter 1040. In another implementation, device 1000 may include additional, fewer, different, or differently arranged components.

Antenna 1005 may send and/or receive RF signals according to a particular frequency band. For example, as shown in FIG. 10, antenna 1005 may send and/or receive RF signals according to a 60 GHz frequency band. Duplexer 1010 may include one or more devices that allow bi-directional communication between antenna 1005 and one or more other components (e.g., converters 1015 and 1040). Duplexer 1010 may operate at the same frequency band as antenna 1005.

Converter 1015 may convert signals (e.g., signals received via antenna 1005), from one frequency band to another frequency band (e.g., as shown in FIG. 10, a 60 GHz band to a 700 MHz band). Transmitter 1020 may produce RF signals based on received signals (e.g., based on signals received from converter 1015). In some implementations, transmitter 1020 may be a MIMO transmitter, which may simultaneously produce multiple RF signals. Transmitter 1020 may include one or more power supplies, oscillators, modulators, amplifiers, and/or impedance matching circuits, which may allow transmitter 1020 to produce the RF signals.

Duplexer 1025 may allow bi-directional communication between antenna 1030 and one or more other components (e.g., transmitter 1020 and receiver 1035). Antenna 1030 may send and/or receive RF signals according to a particular frequency band. For example, as shown in FIG. 10, antenna 1030 may send and/or receive RF signals according to a 700 MHz frequency band.

Receiver 1035 may receive an RF signal (e.g., a signal received via antenna 1030), and may convert the RF signal to a usable form. For example, receiver 1035 may separate the RF signal according to one or more frequency bands (e.g., frequency bands associated with MIMO communications), increase the power of the received signal for further processing, etc. Converter 1040 may convert signals (e.g., signals received from receiver 1035), from one frequency band to another frequency band (e.g., as shown in FIG. 10, a 700 MHz band to a 60 GHz band).

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIGS. 4, 6, and 8, the order of the blocks may be modified in other implementations. Further, non-dependent blocks may be performed in parallel.

Furthermore, while example implementations are described above as including OFDM transmitters, some implementations may perform some of the processes described above using one or more other devices that are different than OFDM transmitters. For example, in some implementations, one or more devices that are different from an OFDM transmitter may encode a data (e.g., a digital data stream) onto to a modulated signal. Additionally, while some example implementations are described above as implementing a MIMO technology, some of the processes described above may apply to other techniques in which multiple data streams are to be transmitted to and/or received from user devices. Further still, while some example implementations are described above as transmitting signals from a base station to a RRH over an unlicensed frequency band, some implementations may signals from a base station to a RRH over a licensed frequency band.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
  receiving, by a remote radio head ("RRH"), from a base station of a cellular network, a first set of modulated signals,
  wherein a first modulated signal, in the first set of modulated signals, and a second modulated signal, in the first set of modulated signals, are based on a first digital data stream received by the base station,
  the first and second modulated signals being phase-shifted and frequency-separated with respect to each other,
  the first and second modulated signals being copies of each other, except for the phase shift and frequency separation with respect to each other,
  wherein a third modulated signal, in the first set of modulated signals, and a fourth modulated signal, in the first set of modulated signals, are based on a second digital data stream received by the base station, the third and fourth modulated signals being phase-shifted and frequency-separated with respect to each other, the third and fourth modulated signals being copies of each other, except for the phase shift and frequency separation with respect to each other, the first set of modulated signals being modulated within a first carrier frequency band, the first set of modulated signals having been wirelessly transmitted by the base station to the RRH via the first carrier frequency band;

generating, by the RRH, a second set of modulated signals based on the first set of modulated signals, the second set of modulated signals being modulated within a second carrier frequency band, the second carrier frequency band being different from the first carrier frequency band; and outputting, by the RRH, the second set of modulated signals to a user device.

2. The method of claim 1, wherein the first carrier frequency band corresponds to an unlicensed frequency band.

3. The method of claim 2, wherein the second carrier frequency band corresponds to a licensed frequency band.

4. The method of claim 1, wherein the base station includes a set of orthogonal frequency-division multiplexing ("OFDM") transmitters, wherein the first and second modulated signals are generated by a first OFDM transmitter, of the set of OFDM transmitters, the first OFDM transmitter receiving the first digital data stream and generating two copies of a modulated signal that is based on the first digital data stream, the two copies being phase-shifted to yield the first and second modulated signals, and wherein the third and fourth modulated signals are generated by a second OFDM transmitter, of the set of OFDM transmitters.

5. The method of claim 1, wherein the plurality of digital data streams correspond to a multi-in multi-out ("MIMO") communication destined for the user device.

6. The method of claim 1, wherein the base station combines the first set of modulated signals into a combined modulated signal, wherein receiving the first set of modulated signals includes receiving the combined modulated signal, wherein the method further comprises separating, by the RRH, the combined modulated signals to obtain the first set of modulated signals, and wherein generating the second set of modulated signals is based on the obtained first set of modulated signals.

7. A system, comprising:

a base station of a cellular communications network; and a remote radio head ("RRH") associated with the base station, the base station being to:

receive a plurality of digital data streams destined for a user device, generate a first set of modulated signals, wherein a first modulated signal, in the first set of modulated signals, and a second modulated signal, in the first set of modulated signals, are copies of each other and are based on a first digital data stream, of the plurality of digital data streams, wherein a third modulated signal, in the first set of modulated signals, and a fourth modulated signal, in the first set of modulated signals, are copies of each other and are based on a second digital data stream, of the plurality of digital data streams, the generated first set of modulated signals being modulated within a first carrier frequency band, wherein the modulated signals, in the first set of modulated signals, include one or more analog signals, generate a first set of phase-shifted and frequency-separated modulated signals, that includes phase-shifted and frequency-separated copies of the first and second modulated signals, generate a second set of phase-shifted and frequency-separated modulated signals, that includes phase-shifted and frequency-separated copies of the third and fourth modulated signals, and wirelessly output the first and second sets of phase-shifted and frequency-separated modulated signals to the remote radio head RRH;

the RRH being to:

receive the first and second sets of phase-shifted and frequency-separated modulated signals, generate a second set of modulated signals based on the first set of phase-shifted and frequency-separated modulated signals, the second set of modulated signals being modulated within a second carrier frequency band, the second carrier frequency band being different from the first carrier frequency band, generate a third set of modulated signals based on the second set of phase-shifted and frequency-separated modulated signals, the third set of modulated signals being modulated within the second carrier frequency band, and output the second set of modulated signals to the user device.

8. The system of claim 7, wherein the first carrier frequency band corresponds to an unlicensed frequency band.

9. The system of claim 8, wherein the second carrier frequency band corresponds to a licensed frequency band.

10. The system of claim 7, wherein the RRH is located in a different physical location than the base station.

11. The system of claim 7, wherein the base station includes a set of orthogonal frequency-division multiplexing ("OFDM") transmitters, wherein the first and second modulated signals are generated by a first OFDM transmitter, of the set of OFDM transmitters, based on the first digital data stream, and wherein the third and fourth modulated signals are generated by a second OFDM transmitter, of the set of OFDM transmitters, based on the second digital data stream.

12. The system of claim 7, wherein the plurality of digital data streams correspond to a multi-in multi-out ("MIMO") communication destined for the user device.

13. The system of claim 7, wherein the base station is further to combine the first and second sets of phase-shifted modulated signals into a combined modulated signal;

wherein when outputting the first and second sets of phase-shifted modulated signals, the base station is to output the combined modulated signal;

wherein when receiving the and second sets of phase-shifted of modulated signals, the RRH is to receive the combined modulated signal;

wherein the RRH is further to separate combined modulated signal to obtain the first set of modulated signals, wherein when generating the second set of modulated signals, the RRH is to generate the second set of modulated signals based on at least a portion of the obtained first set of modulated signals, and wherein when generating the third set of modulated signals, the RRH is to generate the third set of modulated signals based on at least another portion of the obtained first set of modulated signals.

14. A non-transitory computer-readable medium, comprising:

a plurality of computer-executable instructions, which, when executed by one or more processors, cause the one or more processors to:

receive a plurality of digital data streams destined for a user device;

generate a first set of modulated signals, each of the modulated signals, in the first set of modulated signals, being based on a different one of the digital data streams, the generated first set of modulated signals being modulated within a first set of frequencies;

generate a second set of modulated signals, the second set of modulated signals including a plurality of subsets of modulated signals, each subset being associated with a particular modulated signal, of the first set of modulated signals, wherein each modulated signal of a particular subset of modulated signals is associated with a different phase and frequency than other modulated signals of the particular subset, wherein each modulated signal, in the particular subset of modulated signals, is a phase-shifted and frequency-separated copy of the particular modulated signal associated with the particular subset of modulated signals, the phase-shifted copies being based on a same set of data and being copies other than a phase shift and frequency separation with respect to each other, each of the modulated signals, in the second set of modulated signals, being analog signals;

wirelessly output the second set of modulated signals to a remote radio head ("RRH");

receive, by the RRH, the second set of modulated signals;

generate a third set of modulated signals based on the second set of modulated signals, the third set of modulated signals being modulated at a second set of frequencies, the second set of frequencies being different from the first set of frequencies; and output the third set of modulated signals to the user device.

15. The non-transitory computer-readable medium of claim 14, wherein the first set of frequencies corresponds to an unlicensed frequency band.

16. The non-transitory computer-readable medium of claim 15, wherein the second set of frequencies corresponds to a licensed frequency band.

17. The non-transitory The computer-readable medium of claim 14, wherein the base station includes a set of orthogonal frequency-division multiplexing ("OFDM") transmitters, wherein generating the first set of modulated signals is performed by the set of OFDM transmitters.

18. The non-transitory computer-readable medium of claim 14, wherein the plurality of digital data streams correspond to a multi-in multi-out ("MIMO") communication destined for the user device.

19. The method of claim 1, wherein generating the second set of modulated signals, based on the first set of modulated signals, includes:

generating a fifth modulated signal based on the first modulated signal, the fifth modulated signal being modulated within the second carrier frequency band;

generating a sixth modulated signal based on the second modulated signal, the sixth modulated signal being modulated within the second carrier frequency band;

generating a seventh modulated signal based on the third modulated signal, the seventh modulated signal being modulated within the second carrier frequency band; and generating an eighth modulated signal based on the fourth modulated signal, the eighth modulated signal being modulated within the second carrier frequency band, wherein outputting the second set of modulated signals includes outputting the fifth, sixth, seventh, and eighth modulated signals to the user device.

20. The system of claim 11, wherein the base station further includes a first shifter and a second shifter, the first shifter being configured to:

receive the first and second modulated signals from the first OFDM transmitter, and perform the generating of the first set of phase-shifted and frequency-separated modulated signals, based on the first and second modulated signals received from the first OFDM transmitter;

the second shifter being configured to:

receive the third and fourth modulated signals from the second OFDM transmitter, and perform the generating of the second set of phase-shifted and frequency-separated modulated signals, based on the third and fourth modulated signals received from the second OFDM transmitter.

* * * * *